US007001063B1

(12) United States Patent  (10) Patent No.: US 7,001,063 B1
Markle                       (45) Date of Patent:   Feb. 21, 2006

(54) CLEANABLE MIXER DRIVER APPARATUS AND METHOD

(75) Inventor: Stephen L. Markle, Holley, NY (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/060,315

(22) Filed: Feb. 18, 2005

(51) Int. Cl.
  *B01F 13/08* (2006.01)
  *B01F 15/02* (2006.01)
(52) U.S. Cl. ............ 366/168.1; 273/331; 417/420
(58) Field of Classification Search ......... 366/168.1, 366/273, 331; 417/420
  See application file for complete search history.

(56) References Cited

U.S. PATENT DOCUMENTS

| | | | | |
|---|---|---|---|---|
| 4,047,847 A | * | 9/1977 | Oikawa | 417/420 |
| 5,322,421 A | * | 6/1994 | Hansen | 417/420 |
| 5,368,390 A | | 11/1994 | Gambrill et al. | 366/273 |
| 5,427,450 A | | 6/1995 | Gambrill | 366/168.1 |
| 6,702,554 B1 | * | 3/2004 | Sorensen | 417/420 |

* cited by examiner

*Primary Examiner*—Michael Koczo, Jr.
(74) *Attorney, Agent, or Firm*—Baker & Hostetler LLP

(57) ABSTRACT

A drive system for driving a mixer impeller shaft in a vessel, including a motor; an outer magnet rotor driven by the motor; a bearing housing mountable to a vessel; and a drive shaft rotatable in the bearing housing. An inner magnet rotor is connected to the drive shaft and a manifold plate is connected to the bearing housing. A canister is connected to the manifold plate so that a chamber is defined in the bearing housing having an inlet port for directing fluids into the chamber. A plurality of ports extend through the manifold plate providing fluid communication from the chamber to the inside of the canister; and a plurality of ports through the inner magnet rotor provide fluid communication from the inside of the canister through the inner magnet rotor. A fluid path is provided from the chamber through the ports, around the inner magnet motor, and through the inner magnet rotor, which fluid path is sealed from the environment by the canister.

21 Claims, 2 Drawing Sheets

CLEANABLE MIXER DRIVER APPARATUS AND METHOD

FIELD OF THE INVENTION

The present invention relates generally to mixer systems, and more particularly relates a cleanable drive arrangement for a mixer shaft of a mixer system.

BACKGROUND OF THE INVENTION

Mixers are in wide use in a number of industries, including for example medical, pharmaceutical, food, and biotechnology industries. Many of these mixers typically involve a shaft that extends into a vessel to drive a number of impellers which impart a mixing force to the material being mixed inside the vessel. Typically, the shaft is mounted to extend into the vessel by some form of mounting arrangement that also supports a drive motor.

In some types of mixing systems, a seal is located where the shaft enters the vessel to contain material being mixed inside the vessel and also to prevent contaminants outside the vessel from entering the material to be mixed. Some industries have particularly high sanitary requirements in this regard. In response, a type of mixer drive has been developed in which a magnetic drive is provided having an internal canister to positively and completely seal the vessel. The motor on the outside of the canister drives a magnet rotor outside the canister and the shaft inside the vessel has a magnet rotor inside the canister. In this type of arrangement, the motor drives the shaft to drive the magnet rotor that is located outside the canister, the canister remains stationary and the magnet rotor for the impeller shaft is driven by the rotating magnetic field induced by the outer magnetic rotor. Examples, of these types of magnetic drive systems can be found for example in U.S. Pat. No. 5,368,390, to Gambrill et. al, issued Nov. 29, 1994, which is hereby incorporated in its entirety by reference, and U.S. Pat. No. 5,427,450, to Gambrill, issued Jun. 27, 1995, which is also hereby incorporated in its entirety by reference.

The arrangement disclosed U.S. Pat. No. 5,427,450 provides many advantages, including the ability to flush and clean the components which are located inside of the canister in some situations without needing disassembly of the drive system. However, although the system described in U.S. Pat. No. 5,427,450 is very advantageous it is still desired to have improvements to this type of system, such as for example providing a simpler system using fewer parts, and the provision of a system which can if desired provide an even more sanitary arrangement in some applications after it has been cleaned.

Accordingly, there is a need in the art, for an even improved magnetic mixer drive system, which can be cleaned in place.

SUMMARY OF THE INVENTION

The foregoing needs are met, to a great extent, by the present invention, wherein in one aspect an apparatus is provided that in some embodiments provides an even improved magnetic mixer drive system, which can be cleaned in place.

In accordance with one embodiment of the present invention, a drive system for driving a mixer impeller shaft in a vessel, is provided comprising a motor; an outer magnet rotor driven by the motor; a bearing housing mountable to the vessel; a drive shaft rotatable in the bearing housing; an inner magnet rotor connected to the drive shaft; a manifold plate connected to the bearing housing; a canister connected to the manifold plate; a chamber defined in the bearing housing and having an inlet port for directing fluids into the chamber; a plurality of first ports through the manifold plate for providing fluid communication from the chamber to the inside of the canister; and a plurality of second ports through the inner magnet rotor provide fluid communication from the inside of the canister through the inner magnet rotor, whereby a fluid path is provided from the chamber through the first ports, around the inner magnet motor, and through the second ports of the inner magnet rotor, which fluid path is sealed from the environment from the canister.

In accordance with another embodiment of the present invention, a drive system for driving a mixer impeller shaft in a vessel is provided comprising an outer magnet motor; power operated driving means for driving the outer magnet rotor; a bearing housing means mountable to a vessel; a drive shaft rotatable in the bearing housing means; an inner magnet rotor connected to the drive shaft; manifold means connected to the bearing housing; containing means connected to the manifold plate; a chamber defined in the bearing housing and having means for directing fluids into the chamber; a plurality of first ports through the manifold plate for providing fluid communication from the chamber to the inside of the canister; and a plurality of second ports through the inner magnet rotor provide fluid communication from the inside of the canister through the inner magnet rotor, whereby a fluid path is provided from the chamber through the first ports, around the inner magnet motor, and through the second ports of the inner magnet rotor, which fluid path is sealed from the environment from the canister.

In accordance with yet another embodiment of the present invention, a method of cleaning a drive system for driving mixer impeller shaft in a vessel includes providing a drive system comprising a motor; an outer magnet rotor driven by the motor; a bearing housing mountable to the vessel; a drive shaft rotatable in the bearing housing; an inner magnet rotor connected to the drive shaft; a manifold plate connected to the bearing housing; a canister connected to the manifold plate; a chamber defined in the bearing housing and having an inlet port for directing fluids run into the chamber; a plurality of first ports through the manifold plate for providing fluid communication from the chamber to the inside of the canister; and a plurality of second ports through the inner magnet rotor provide fluid communication from the inside of the canister through the inner magnet rotor, whereby a fluid path is provided from the chamber through the first ports, around the inner magnet motor, and through the second ports of the inner magnet rotor, which fluid path is sealed from the environment from the canister, and forcing a cleaning and/or rinsing fluid to the inlet post to clean the drive system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
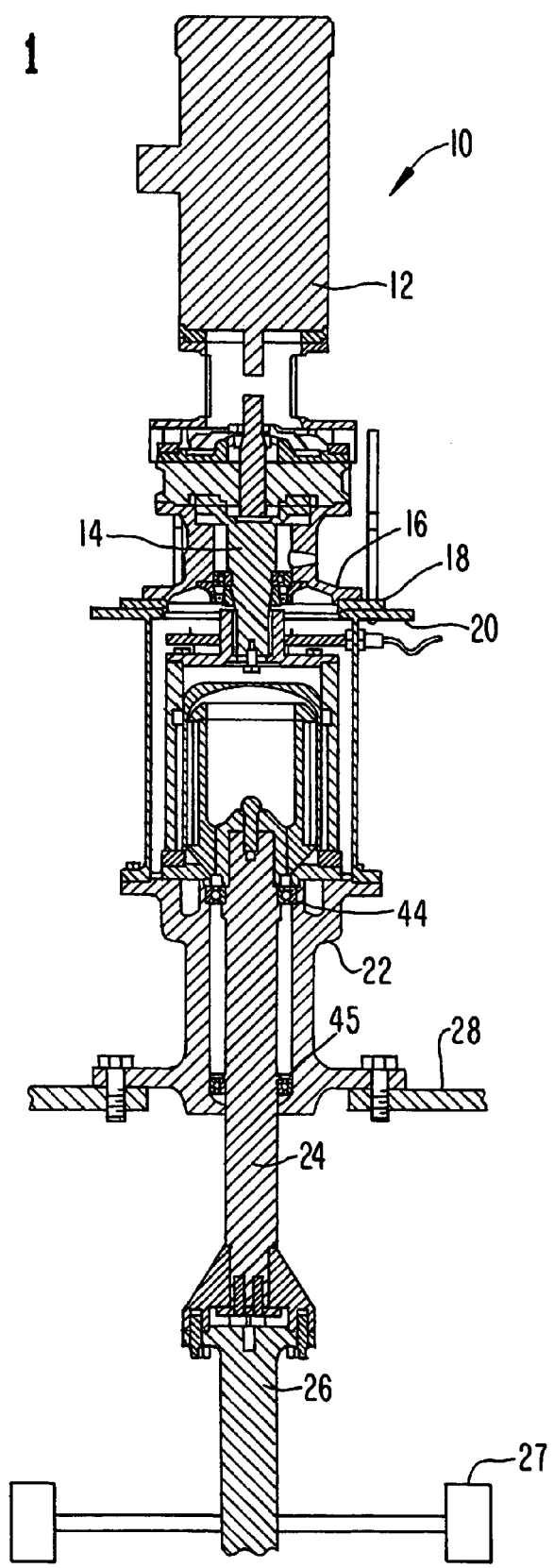
FIG. 1 is a cross-sectional view illustrating a mixer driver assembly.

Some embodiments of the present invention provide an improved majestic mixer drive system which can be cleaned in place. Preferred embodiments will now be described with references to the drawing figures in which like reference numerals refer to like parts throughout.

FIG. 1 is a cross-sectional view illustrating a magnetic mixer drive assembly 10, including a motor 12 that drives a motor shaft 14. A motor 12 is supported by a motor mount 16, which is mounted by a plate 18 to the top of a pedestal 20. The pedestal 20 surrounds the lower part of the motor shaft 14, as well as other components which will be explained later, and at its lower end the pedestal 20 is mounted to the top of a bearing housing 22. The bearing housing 22 support drive shaft 24 by means of bearing which are described in more detail below. The drive shaft 24 extends through the bearing housing 22 and projects downwardly below the bearing housing 22. The drive shaft 24 may have impellers radially extending therefrom, or maybe connected by a coupling to an impeller shaft 26 which has impellers 27 extending radially therefrom. The bearing housing 22 is mounted at its lower end to opening at the top of the vessel 28, which vessel 28 provides a container for the fluid or other material that is to be mixed by the impellers 27. The impeller shaft 26 may have one or several sets of radially extending impellers along its length keeping with the particular mixing requirements involved.

As will be described in more detail below, the motor 12 rotatably drives the gear reducer shaft 14, and a magnetic coupling between the reducer shaft 14 and the drive shaft 24 causes those two shafts to be rotationally coupled and rotate together with each other, so that in effect, the motor 12 provides rotational force to the drive shaft 14, and also the impeller shaft 26. Details of this coupling are illustrated in FIG. 2.

Figure 2:
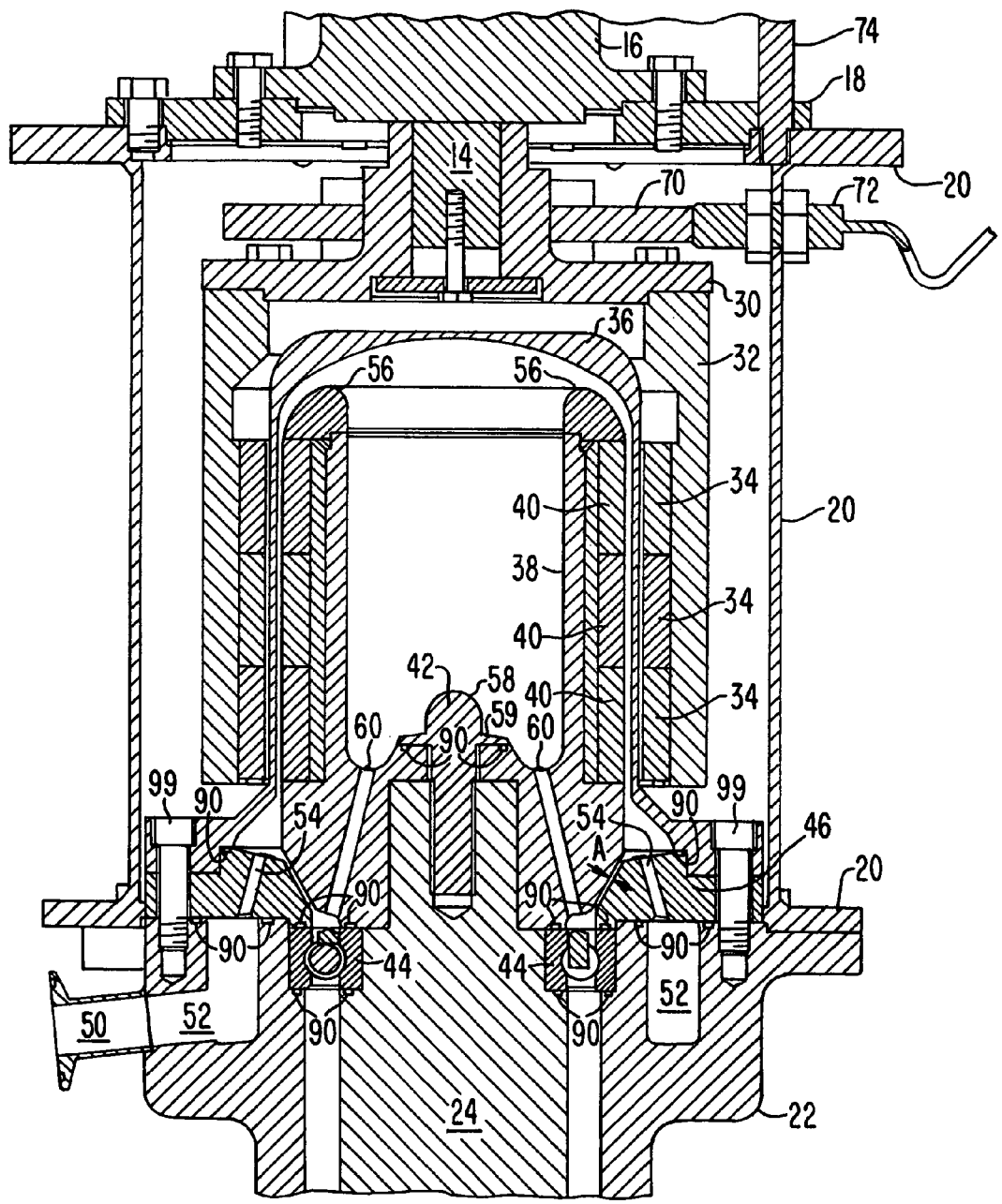
FIG. 2 is a detailed cross-sectional view showing the central drive components of the preferred embodiment of FIG. 1.

Turning now to FIG. 2, the top of the drawing illustrates the lower part of the mount 16 mounted by the plate 18 onto the top of the pedestal 20. The reducer shaft 14 extends somewhat below the mount 16 and is connected by a bolt and other suitable connecting mechanism to a coupling rotor collar 30 that has attached to it an outer magnet rotor 32. The outer magnet rotor 32 supports a plurality of magnets 34, which are spaced slightly outward from the outside edge of a canister 36. Inside the canister 36 is disposed an inner magnet rotor 38 which support a plurality of outward facing magnets 40, which are spaced radially inward from the inside surface of the canister 36. An inner rotor bolt 42 attaches the inner magnet rotor 40 to a drive shaft 24. The drive shaft 24 is rotationally supported in the bearing housing 22 by upper bearings 44, and lower bearings 45 (see FIG. 1).

Returning to FIG. 2, the above described arrangement provides a magnetically coupled drive between the reducer shaft 14 and the drive shaft 24. The canister 36 is a dome shaped hollow cylinder closed at its top end, with its open lower end mounted directly to a manifold plate 46. The manifold plate 46 in turn is mounted directly to the top of the bearing housing 22. Thus, it can be appreciated that a positive enclosure is formed by the canister 36, manifold plate 46, and bearing housing 22, the inside of which enclosure is exposed to the internal volume of the vessel 28, and the outside of which is exposed to the ambient environment, although it is generally covered by the pedestal 20, plate 18 and motor mount 16, with the outer magnetic motor 32, collar 30, as set also being outside the canister 36.

A cleaning flow path arrangement is provided in the preferred embodiment. In the illustrated embodiment, an inlet fitting 50 leads into a circumferential chamber 52 in the bearing housing 22. A plurality of manifold ports 54 are spaced circumferentially and penetrating through the manifold plate 46 as shown. The ports 54 thus provide for fluid movement from the chamber 52 up into the space inside the canister 36 and surrounding the inner magnet rotor 38. The inner magnet rotor has a curved top end 56 as shown. The inner rotor bolt 42 has a domed top surface 58. The inner magnet rotor 38 further has a plurality of circumferentially arranged ports 60, which extends from the interior of the inner magnet rotor 38 through the lower part of the inner magnet rotor 38 and into a space located just above bearings 44.

During operation, the inlet fitting 50 can be sealed off by any conventional sealing arrangement, in which case the above described fluid passage area is sealed from the external environment, and thus the material to be mixed is also sealed from the external environment.

When mixing has been completed, it is sometimes desired to clean and/or flush the mixer driver's arrangement illustrated in FIG. 2 and such a flushing can be accomplished as follows. Any cleaning or rinsing fluid, whether it be water or a chemical cleaning fluid, can be provided to the inlet fitting 50 using a sanitary fitting. The cleaning or rinsing fluid is provided under a positive pressure and will flow into the chamber 52 and then upward through the ports 54. The majority of this fluid will be urged upward by the fluid pressure through the space between the inner magnet rotor 40 and the inside of the canister 36 and will flow upward over the rounded top end of the inner magnet rotor 38. The fluid will then partially or completely fill the area inside the inner magnet rotor 40 and will travel downward through the length of the ports 60, thus being provided to the top surface of the bearings 44 and washing through the bearings 44 and continuing down the space between the drive shaft 24 and the bearing housing 22, until it contacts the lower set of bearing and then flows over the lower set of bearings and out through a space provided between the bottom of the bearing housing 22 and the outside of the drive shaft 24, and thus into the vessel itself. In this way, a one flushing type flow can be provided at the inlet fitting and will wash over all the internal exposed surfaces of the drive arrangement, including bearing 44 and the lower bearing 45, before the flushing material is provided into the vessel area.

It is noted that a spacing A is provided between a lower beveled edge of the inner magnet rotor 38 and beveled inner edge of the manifold plate 46. This spacing is necessary to permit rotation of the inner magnet rotor 38 relative to the stationary manifold plate 46. However, as this spacing is relatively small in some embodiments, some of the cleaning or rinsing material will flow through this space but the majority of the cleaning or rinsing material will still be forced upward and over the inner magnet rotor 38.

The surfaces of the illustrated embodiment are specially designed to have desirable cleaning properties. For example, as noted above the top of the inner magnet rotor 56 has a curved configuration without any planar or horizontal surfaces. Similarly, the top of the inner rotor bolt 42 has a dome surface 58 with slightly sloping shoulders 59 and the lower inner region of the inner magnet rotor 38 in the area near the port 60 has a concaved curved profile. Further, the top of the manifold plate 36 in the region of the port 54 has a downward sloping, non-horizontal, arrangement. By virtue of all these features, it can be seen that the cleaning flow area has no planar horizontal surfaces, in some embodiments, provides the advantage of reducing deposits of fine materials or drying of tiny droplets of cleaning material residue.

The materials are also selected to interact well with the cleaning and or flushing fluids, for example, the bearing housing 22, manifold plate 46, canister 36, and inner magnet rotor 38, as well as the inner rotor bolt 42 are typically made of stainless steel. Further, the bearings 44 and 45 are of a type using ceramics so that they do not require lubrication and are not damaged by cleaning and/or flushing solutions.

One benefit of the example embodiment illustrated in FIG. 2, is that a relatively few number of components are involved, and accordingly a relatively small number of surface to surface seals needs to be accomplished to maintain sealing of the fluid flow path. It is noted that O-rings 90 are used (1) to seal the inner rotor bolt 42 to the inner magnet rotor 38, (2) to seal the manifold plate 36 to the canister 36, (3) in two places to seal the bearing housing 22 to the manifold plate 36 around the chamber 52, and (4) and in two places to seal the bearings 44. This relatively economical use of relatively few o-rings accomplishes complete sealing of the inner driver arrangement from the outer environment and this provides an advantage of the prior art.

Although the above description refers to some extent to horizontal and vertical directions, it will be appreciated that the embodiments of the invention need not be vertical in orientation, and need not be at the top of a vessel. Further, accessory features may be provided such as a tachometer plate 70 and a tachometer pick-up 72 to measure drive speed, as well as a guide rod 74 which may facilitate orientation and aid in removal of the drive, by centering the coupling as to not come in contact with the canister.

The preferred embodiments of the arrangement described herein may be suitable for any of a variety of cleaning and flushing procedures. In one preferred cleaning procedure several fluids are forced through the system for approximately one half hour each between batches of mixer operations. Such a preferred sequence includes (1) washing with distilled water, (2) flushing with caustic solution, (3) flushing with distilled water, (4) flushing with acid, (5) drying with air, and (6) applying steam to heat the internal surfaces to approximately 275 degrees Fahrenheit.

As has been described above, one of the beneficial qualities of the illustrated preferred embodiment is that none of the parts that contact these cleaning fluids drive system has a flat horizontal surface which might tend to retain particles or residue. Further, due to the fairly abrupt change in size between the top of the chamber 52 and the relatively much smaller port 54, if the cleaning or rinsing solution has large contaminants in it, such contaminants typically do not travel through the small ports 54 and thus remain within the large chamber 52, from which they are typically fairly easy to remove from the inlet fitting 50, without requiring major disassembling of the apparatus. Further, if these large contaminants can not be removed via the inlet fitting 50, the bolts 99 which attach the canister 36 and manifold plate 46 to the bearing house 22 can be removed thus providing easy access to the chamber 52 via a very simple disassembly step.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A drive system for driving a mixer impeller shaft in a vessel, the drive system comprising:
   a motor;
   an outer magnet rotor driven by the motor and a gear reducer;
   a bearing housing mountable to the vessel;
   a drive shaft rotatable in the bearing housing;
   an inner magnet rotor connected to the drive shaft;
   a manifold plate connected to the bearing housing;
   a canister connected to the manifold plate;
   a chamber defined in the bearing housing and having an inlet port for directing fluids into the chamber;
   a plurality of first ports through the manifold plate for providing fluid communication from the chamber to the inside of the canister; and
   a plurality of second ports through the inner magnet rotor for providing fluid communication from the inside of the canister through the inner magnet rotor,
   whereby a fluid path is provided from the chamber through the first ports, around the inner magnet motor, and through the second ports of the inner magnet rotor, which fluid paths is sealed from the environment from the canister.

2. The system of claim 1, wherein the drive shaft is connected to the inner magnet rotor by an inner rotor bolt having a curved top surface with sloping shoulders.

3. The system of claim 1, wherein the inner magnet rotor has a first end and a second end, with the first end mounted to the drive shaft, and the second end having a curved rounded end profile.

4. The system according to claim 1, when the manifold plate has a top surface that has an angled frustoconical profile.

5. The system of claim 1, wherein the inner magnet rotor has a concaved curved profile in the region of the second ports.

6. The system of claim 1, further comprising an inlet fitting on the inlet port.

7. The system of claim 1, further comprising a bearing that rotationally supports the drive shaft in the bearing housing, with the bearing being trapped between the bearing housing and the manifold plate in direct contact with the bearing housing and the manifold plate.

8. The system according to claim 7, wherein the bearing is also trapped between the drive shaft and the inner magnet rotor, with direct contact between the drive shaft and the inner magnet rotor.

9. A drive system for driving a mixer impeller shaft in a vessel, the drive system comprising:
   an outer magnet rotor;
   power operated driving means for driving the outer magnet rotor;
   a bearing housing means mountable to a vessel;
   a drive shaft rotatable in the bearing housing means;
   an inner magnet rotor connected to the drive shaft;
   manifold means connected to the bearing housing;
   containing means connected to the manifold plate;
   a chamber defined in the bearing housing and having means for directing fluids into the chamber;
   a plurality of first ports through the manifold plate for providing fluid communication from the chamber to the inside of the containing means; and
   a plurality of second ports through the inner magnet rotor provide fluid communication from the inside of the containing means through the inner magnet rotor,
   whereby a fluid path is provided from the chamber through the first ports, around the inner magnet motor, and through the second ports of the inner magnet rotor, which fluid path is sealed by the environment from the containing means.

10. The system of claim 9, wherein the drive shaft is connected to the inner magnet rotor by an inner rotor fastening means having a curved top surface with sloping shoulders.

11. The system of claim 9, wherein the inner magnet rotor has a first end and a second end, with the first end mounted to the drive shaft, and the second end having a curved rounded end profile.

12. The system according to claim 9, when the manifold means has a top surface that has an angled frustoconical profile.

13. The system of claim 9, wherein the inner magnet rotor has a concaved curved profile in the region of the second ports.

14. The system of claim 9, further comprising an inlet fitting on the inlet port.

15. The system of claim 9, further comprising a bearing that rotationally supports the drive shaft in the bearing housing, with the bearing being trapped between the bearing housing means and the manifold means in direct contact with the bearing housing means and the manifold means.

16. The system according to claim 15, wherein the bearing is also trapped between the drive shaft and the inner magnet rotor, with direct contact between the drive shaft and the inner magnet rotor.

17. A method of cleaning a drive system for driving mixer impeller shaft in a vessel, comprising:
   providing a drive system comprising:
   a rotor;
   an outer magnet rotor driven by the motor;
   a bearing housing mountable to the vessel;
   a drive shaft rotatable in the bearing housing;
   an inner magnet rotor connected to the drive shaft;
   a manifold plate connected to the bearing housing;
   a canister connected to the manifold plate;
   a chamber defined in the bearing housing and having an inlet port for directing fluids run into the chamber;
   a plurality of first ports through the manifold plate for providing fluid communication from the chamber to the inside of the canister; and
   a plurality of second ports through the inner magnet rotor provide fluid communication from the inside of the canister through the inner magnet rotor,
   whereby a fluid path is provided from the chamber through the first ports, around the inner magnet motor, and through the second ports of the inner magnet rotor, which fluid paths is sealed from the environment from the canister, and
   forcing a cleaning and/or rinsing fluid to the inlet port to clean the drive system.

18. The method of claim 17, wherein the drive shaft is connected to the inner magnet rotor by an inner rotor bolt having a curved top surface with slopping shoulders.

19. The method of claim 17, wherein the inner magnet rotor has a first end and a second end, with the first end mounted to the drive shaft, and the second end having a curved rounded end profile.

20. The method according to claim 17, when the manifold plate has a top surface that has an angle frustoconical profile.

21. The method of claim 17, wherein the inner magnet rotor has a concaved curved profile in the region of the rotor ports.

* * * * *